US009600158B2

(12) United States Patent
Temkin et al.

(10) Patent No.: US 9,600,158 B2
(45) Date of Patent: Mar. 21, 2017

(54) SYSTEMS AND METHODS FOR AGGREGATING INFORMATION AND PROVIDING ACCESS TO MULTIPLE WEB SERVICES THROUGH AN INTERACTIVE USER INTERFACE

(71) Applicant: AOL Inc., Dulles, VA (US)

(72) Inventors: David Temkin, San Francisco, CA (US); Oliver Steele, Amherst, MA (US); Jim Sabia, Warrenton, VA (US); Thomas Andrew McDonald, San Francisco, CA (US); Michael John Ackerman, San Jose, CA (US); Lorien Mae Henry-Wilkins, San Mateo, CA (US); Sarah Allen, San Francisco, CA (US)

(73) Assignee: AOL Inc., Dulles, VA (US)

( * ) Notice: Subject to any disclaimer, the term of this patent is extended or adjusted under 35 U.S.C. 154(b) by 278 days.

(21) Appl. No.: 14/212,658

(22) Filed: Mar. 14, 2014

(65) Prior Publication Data
US 2014/0282166 A1 Sep. 18, 2014

Related U.S. Application Data

(60) Provisional application No. 61/799,869, filed on Mar. 15, 2013.

(51) Int. Cl.
G06Q 50/00 (2012.01)
G06F 3/0484 (2013.01)
(Continued)

(52) U.S. Cl.
CPC ...... *G06F 3/04845* (2013.01); *G06F 17/3089* (2013.01); *G06Q 10/10* (2013.01); *G06Q 50/01* (2013.01)

(58) Field of Classification Search
CPC .. G06F 3/04845; G06F 17/3089; G06Q 50/01
See application file for complete search history.

(56) References Cited

U.S. PATENT DOCUMENTS 6,909,439 B1 *  6/2005  Amro ................ G06F 3/04855
                                                    345/660
2007/0162845 A1 *  7/2007  Cave ..................... G06F 17/218
                                                    715/209

(Continued)

OTHER PUBLICATIONS

PCT International Search Report and Written Opinion, International Application No. PCT/US2014/023236, mailed Jul. 22, 2014 (9 pages).

*Primary Examiner* — Jeffrey A Gaffin
*Assistant Examiner* — Rinna Yi
(74) *Attorney, Agent, or Firm* — Finnegan, Henderson, Farabow, Garrett & Dunner, LLP

(57) ABSTRACT

Computerized systems and methods are disclosed for aggregating information and digital services into an interactive user interface. In accordance with certain embodiments, computerized systems and methods are provided that display a plurality of tiles for a plurality of sources, the plurality of sources being provided by at least a first information provider and a second information provider. The systems and methods may further include receiving a selection of content within a first tile in the plurality of tiles, the content being provided by the first information provider. The systems and methods may further include dragging, based on input from the first user, the selected content onto a second tile linked to the second information provider. The systems and methods may further include sending, based on the dragging, the selected content to the second information provider to share the selected content with a second user.

17 Claims, 8 Drawing Sheets

(51) Int. Cl.
*G06F 17/30* (2006.01)
*G06Q 10/10* (2012.01)

(56) References Cited

U.S. PATENT DOCUMENTS

| | | |
|---|---|---|
| 2010/0070899 A1 | 3/2010 | Hunt et al. |
| 2011/0202848 A1* | 8/2011 | Ismalon .............. G06F 17/3089 715/738 |
| 2011/0265043 A1 | 10/2011 | Knitowski et al. |
| 2012/0096410 A1* | 4/2012 | Lancaster ......... G06F 17/30905 715/854 |
| 2013/0132886 A1* | 5/2013 | Mangini ................ G06F 3/048 715/781 |

* cited by examiner

400

410

SYSTEMS AND METHODS FOR AGGREGATING INFORMATION AND PROVIDING ACCESS TO MULTIPLE WEB SERVICES THROUGH AN INTERACTIVE USER INTERFACE

CROSS-REFERENCE TO RELATED APPLICATION(S)

This application claims the benefit of U.S. Provisional Application No. 61/799,869, filed on Mar. 15, 2013, the entire disclosure of which is expressly incorporated herein by reference.

BACKGROUND

Technical Field

The present disclosure relates generally to computerized systems and methods for aggregating data and services from multiple sources. More particularly, and without limitation, the present disclosure relates to systems and methods for presenting aggregated information and access to a plurality of services (such as web or digital services) on an interactive user interface in a uniform manner across multiple devices.

Background

Various solutions exist for aggregating data. For example, RSS readers may aggregate feeds from multiple websites. These solutions, however, lack several drawbacks and disadvantages. For example, conventional solutions in this area lack the ability to provide user interactions that allow a user to view more information without changing a view or leaving a page, to share customized views with other users, and to allow the user to perform operations between the data sources.

Accordingly, there exists a need to provide solutions that allow online users with improved systems and methods that provide better aggregation tools and enable enhanced user interactions and access to information and services from multiple sources. There are exists a need for computerized systems and methods that can present aggregated information and access to a plurality of different services through a user interface in a uniform manner across multiple devices.

SUMMARY

Consistent with embodiments of the present disclosure, systems and methods are provided for aggregating data and multiple services. The present disclosure also encompasses embodiments for providing computerized systems and methods for aggregating data from multiple web services and/or other sources, and presenting the aggregated information to a user on an interactive user interface, such as a dashboard with a plurality of interactive tiles. Embodiments of the present disclosure also provide solutions for presenting aggregated information and providing access to a plurality of different services in a uniform manner across multiple devices.

In accordance with some embodiments, a computer-implemented method is disclosed for providing an interactive user interface with a plurality of tiles. The method may comprise operations performed by one or more processors. The operations of the method may include displaying, on a device of a first user, the plurality of tiles that are associated with a plurality of sources. The operations of the method may further comprise receiving, from the first user, a selection of a content within a first tile in the plurality of tiles, the content being provided by a first information provider. The operations of the method may further comprise dragging, based on input from the first user, the selected content onto a second tile linked to a second information provider. The operations of the method may further comprise sending, based on the dragging, the selected content to the second information provider to share the selected content with a second user.

In accordance with other embodiments, a system of a first user for providing a portal is disclosed. The system may comprise a display, at least one processor, and/or a memory storing a set of instructions that, when executed by the at least one processor, cause the at least one processor to display, on a device of a first user, the plurality of tiles that are associated with a plurality of sources, and receive, from the first user, a selection of a content within a first tile in the plurality of tiles, the content being provided by a first information provider. The instructions may further cause the at least one processor to drag, based on input from the first user, the selected content onto a second tile linked to a second information provider, and send, based on the dragging, the selected content to the second information provider to share the selected content with a second user.

In still further embodiments, a non-transitory computer-readable medium storing a set of instructions which, when executed by at least one processor, causes the at least one processor to perform a method is disclosed. The method may comprise displaying, on a device of a first user, the plurality of tiles that are associated with a plurality of sources. The method may further comprise receiving, from the first user, a selection of a content within a first tile in the plurality of tiles, the content being provided by a first information provider. The method may further comprise dragging, based on input from the first user, the selected content onto a second tile linked to a second information provider. The method may further comprise sending, based on the dragging, the selected content to the second information provider to share the selected content with a second user.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute a part of this specification, illustrate several embodiments of the present disclosure and together with the description, serve to explain the principles of the disclosed embodiments.

DETAILED DESCRIPTION OF EXEMPLARY EMBODIMENTS

Reference will now be made in detail to exemplary embodiments implemented according to the present disclosure, examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 1:
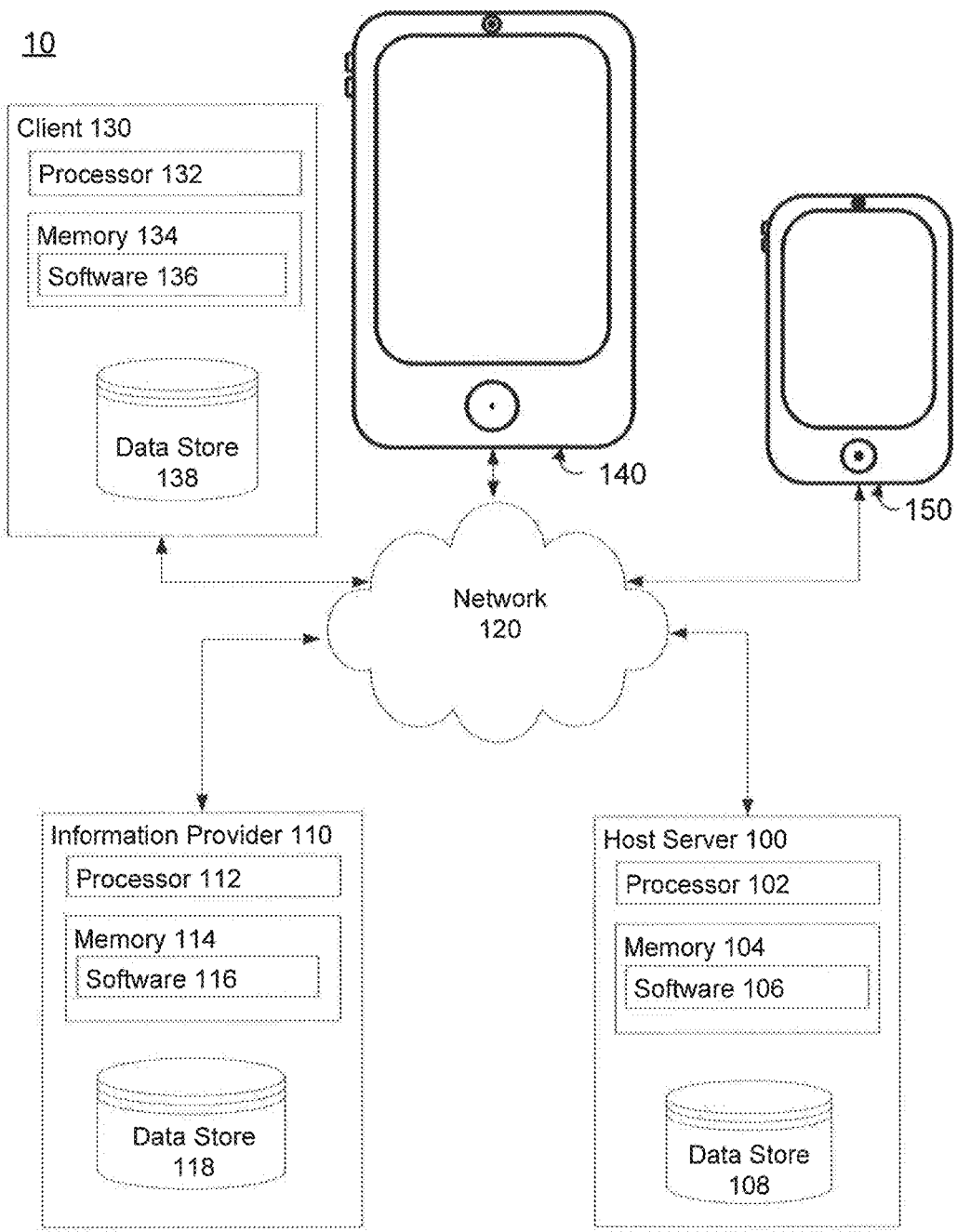
FIG. 1 depicts a block diagram of an exemplary system environment in which embodiments consistent with the present disclosure may be practiced and implemented.

FIG. 1 illustrates an exemplary system environment 10 in which embodiments consistent with the present disclosure may be practiced and implemented. As further disclosed herein, environment 10 of FIG. 1 may be used to provide an interactive user interface. The interactive user interface may be implemented as a dashboard with a plurality of tiles (see, e.g., FIG. 2). Each tile may include interactive features and provide information and/or other content to a user associated with one or more sources. The various sources may include web or digital services created or offered by information providers, including content and service providers. The tiles may also provide efficient ways for users to access a plurality of different services.

As shown in FIG. 1, system environment 10 may include one or more host servers 100, information providers 110, client devices 130, and secondary client devices (e.g., mobile devices 140 and 150). All of these components may be disposed for communication with one another via an electronic network 120. Electronic Network 120 may comprise, in some embodiments, the Internet, but may in other embodiments comprise any number and configuration of different types of communication networks, such as an intranet, a Local Area Network (LAN), a Wide-Area Network (WAN), a Metropolitan-Area Network (MAN), or the like.

In some embodiments, host server 100, information provider 110, client device 130, and/or secondary devices 140 and 150 can be implemented by a single device or multiple devices. As will be appreciated, the form and arrangement of devices and other elements in FIG. 1 is for purposes of illustration. Embodiments of the present disclosure may be implemented using similar or other arrangements, as well as different quantities of devices and/or other elements than what is illustrated in FIG. 1.

In certain embodiments, host server 100, information provider 110, client device 130, and/or secondary devices 140 and 150 may each be implemented using an assembly of hardware, including a memory, a central processing unit ("CPU"), and a user interface. The memory may include any type of RAM or ROM used for storing, either permanently or temporarily, software modules or instructions for execution by the CPU. The memory may also include a tangibly-embodied nontransitory computer-readable storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing instructions. An optional user interface may be included with any of host server 100, information provider 110, client device 130, and/or secondary devices 140 and 150, and may include any type or combination of input/output devices, such as a display monitor, keyboard, or mouse.

As will be described in more detail below, in certain embodiments, host server 100 may be configured to send and receive application programming interface (API) requests to and from information providers 110 for retrieving data from and interacting with the one or more services provided by information provider 110. An API may be a source code interface that a computer system or library provides in order to support requests from a software application. An API may be specified in terms of a programming language that can be interpretative or compiled when an application is built, rather than an explicit low-level description of how data is laid out in memory. The software that provides the functionality described by an API is said to be an implementation of the API. In some embodiments, host server 100 may receive one or more data feeds from information provider 110 and/or crawl information provided by information provider 110 (e.g., a web site).

Host server 110 may also be configured to accept requests from users to provide a user interface that aggregates data from multiple information providers, for example, an online dashboard. The dashboard may include any portal or webpage for displaying a graphical user interface to user on client device 130 or secondary client devices 140 and 150.

Figure 2:
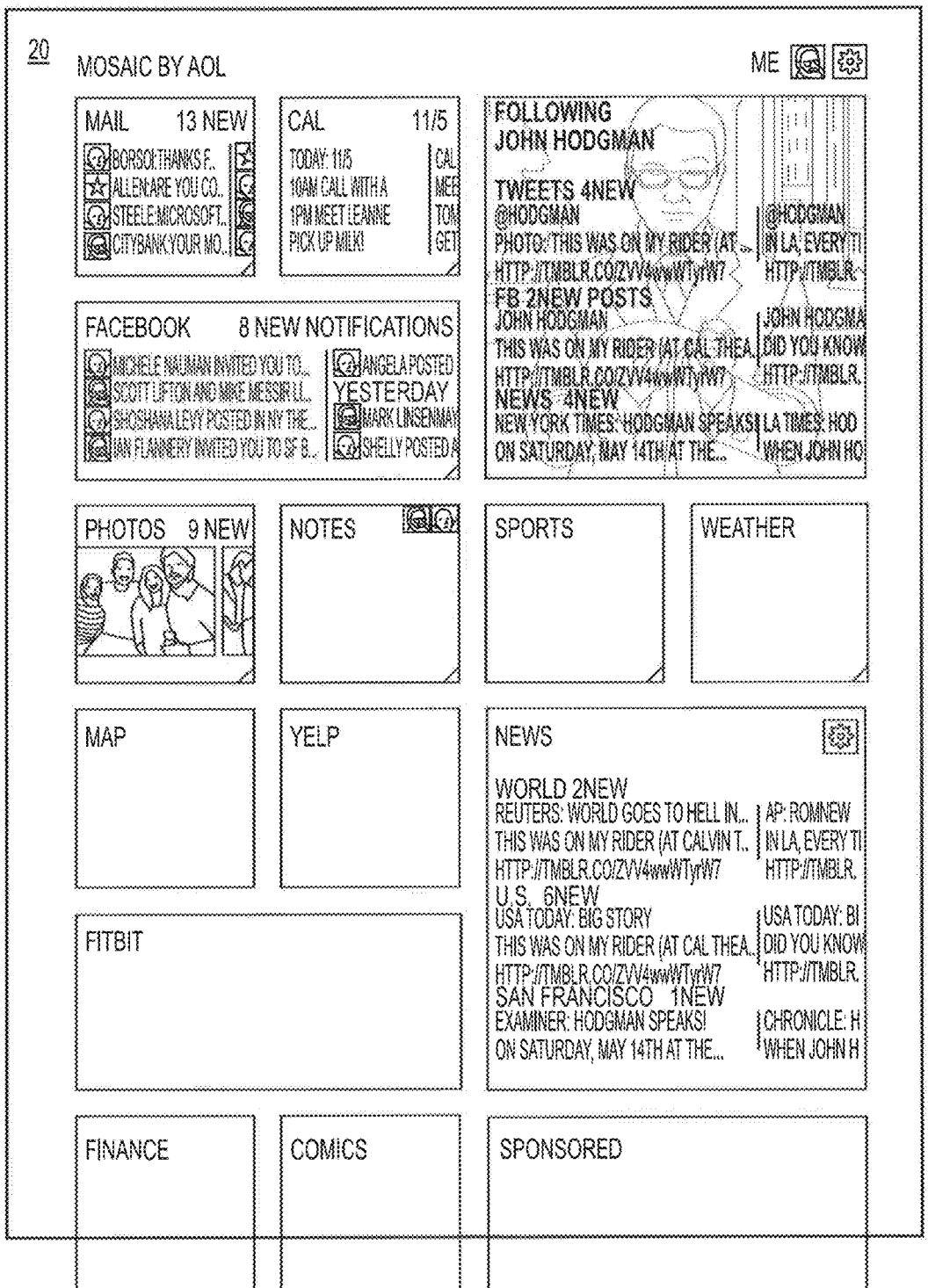
FIG. 2 depicts an exemplary interactive user interface in the form of a dashboard with a plurality of tiles, consistent with embodiments of the present disclosure.

FIG. 2 depicts an exemplary user interface 20, consistent with embodiments of the present disclosure. Consistent with certain embodiments, an instance of the user interface may include brand elements, a tile layout, and a set of tiles. The user interface may be presented, for example, as a webpage accessed using a browser or it may be integrated into a native application. In certain embodiments, the user interface may be persistent across all of a user's devices. For example, the user interface may appear to be the same on client device 130 and mobile devices 140 and 150. In such embodiments, modifications to the interface on one of the devices would appear and result in modifications in the interface on the other devices. Further, the user nterface may remember where the user left off for each tile. For example, where a user stopped a video playing in one of the tiles.

Brand elements comprise elements that should always appear in the interface. These could include, for example, search boxes, branding images (e.g., logos of the provider of host server 100), and other content elements that would be consistent across all users.

The tile layout may define how the user interface is structured. The tile layout may be invisible to the user. The tile layout may include the code that controls how the tiles are displayed by default and may include code that allows the user to personalize the tile layout. The default tile layout may be the same for all users or it may be based on one or more characteristics of the user. The tile layout may also remember the last state of the user interface. The tile layout may also include a mode or setting that allows the user to modify it. The tile layout may allow the user interface to remember the user's preferences, such as tile size and placement.

As noted above, the interactive user interface may include one or ore tiles to present information to a user from one or more sources, including content and other information related to web or digital services. For example, host server 100 may receive a request from client device to provide a user interface including one or more tiles to present data from a particular information provider 110. Tiles may be recommended to a user based on profile information (e.g., people or brands that a person subscribes to, friends, location, age, gender, etc.). Information providers may include, for example, news service providers (e.g., HUFFINGTON POST™, CNN™, FOX NEW™, MSNBC™, CSPAN™, NEW YORK TIMES™, THE WALL STREET JOURNAL™, ESPN™etc.), social media providers (e.g., FACEBOOK™, MYSPACE™, TWITTER™, INSTAGRAM™, PINTERST™, VINE™, etc.), content service providers (e.g., NETFLIX™, PANDORA™, AMC™, REDBOX™, etc.), information service providers (e.g., MAPQUEST™, MOVIEPHONE™, YELP™, DROPBOX™, etc.), commerce service providers (e.g., AMAZON™, GROUPON™, LIVINGSOCIAL™, OVERSTOCK.COM™, etc.), messaging service providers (e.g, e-mail, SMS, etc.), as well as other content and service providers. As used herein, the term "information provider" encompasses all types of content and service providers, including providers of web or digital services, such as the examples noted above.

To enable interactive features for users, tiles may be associated with one or more applets or applications. For example, a tile for a pinning an article from an information provider, a tile for pinning a document, a tile for providing games (e.g., Sudoku, crosswords, etc.), a tile for notes, a tile for a calendar, a tile for weather, a tile for aggregating content about a particular topic (e.g., a celebrity), etc. Tiles may be based upon one or more stacks, similar to the embodiments disclosed in U.S. Provisional Application No. 61/715,290, filed Oct. 18, 2012, and titled "Systems and Methods for Processing Electronic Content." The disclosure of the above-referenced provisional application is expressly incorporated herein by reference in its entirety.

The information for providing the tiles may come directly from information provider 110 (e.g., via HTTP GET requests), be aggregated for information provider 110 by host server 100, and/or be generated by host server 100. The tiles may be created by the host or by a third-party. Tiles may also be created by a user grabbing and dropping content objects from a tile to pin the content objects as new tiles. This may be used, for example, to create document tiles. Document tiles may track a single file to provide edit and/or access information to the user. Bookmarklet tiles may be created by a user bookmarking one or more websites. Search tiles may be created based on one or more searches entered by the user. A user may also create a tile that follows one or more other users.

Consistent with embodiments of the present disclosure, a tile may include content, such as one or more images, formatted text, video, and/or links. The content may be included in a container for the tile that may include branding and/or visual elements. As discussed below, the tiles may support user interaction and/or dynamically changing content. The content may dynamically change based on time and/or a user's interactions with the tile.

A tile may also support multiple sizes or views. A simple version of a tile may include, for example, a server generated image that may be created by host server 100 or information provider 110. In some embodiments, the simple version of the tile may include dynamically generated content, such as a graph, that renders data. The data may include, for example, JSON (JavaScript Object Notation) data. In other embodiments, the tiles may be more complex and include one or more images while also supporting dynamic data. The tiles may also use one or more technologies to render the tile, such as CSS sprites. In some embodiments, the tiles may be an instance of a mini web application. The user interface may also allow the user to create one or more custom tiles.

Figure 3A:
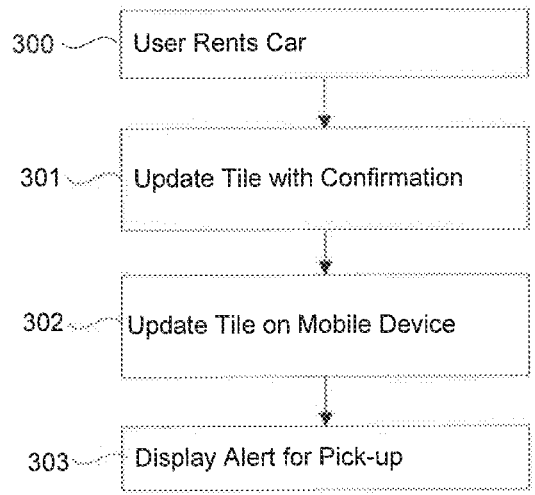
FIG. 3A depicts an exemplary process for updating a dashboard, consistent with embodiments of the present disclosure.

FIG. 3A depicts an exemplary process for updating a dashboard, consistent with embodiments of the present disclosure. In the following description, an example is given with reference to a reservation service. It will be appreciated, however, that the exemplary process of FIG. 3A may be adapted for similar or other types of services, including any of the web services noted above.

Figure 3B:
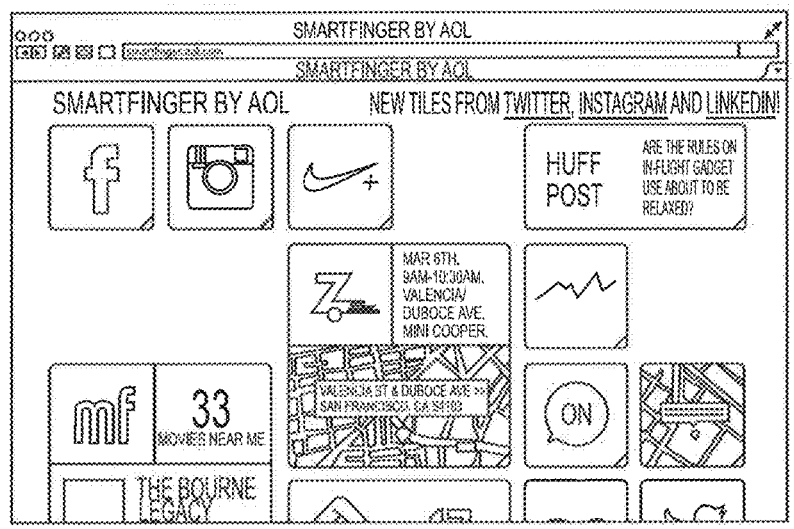
FIGS. 3B-3D depict exemplary updated dashboards, consistent with embodiments of the present disclosure.

In step 300, a user may make a reservation to rent a car. This step may be performed in a tile on client 130, using an application on client 130, or external to client 130. In step 301, a tile displayed in the user interface of client 130 may be updated to reflect the reservation. As shown in FIG. 3B, for example, the title may be updated to include a date, time, and/or location of the reservation. This could include, for example, displaying a map showing the location of the reservation.

Figure 3C:
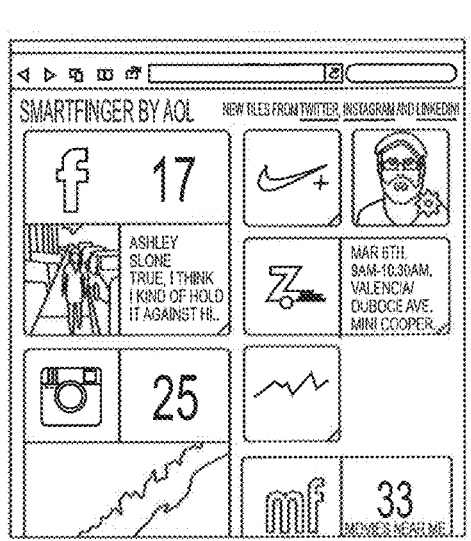
Figure 3D:
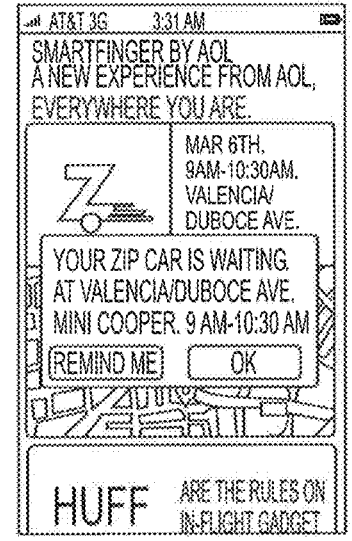

Referring again to FIG. 3A, in step 302, the user interface on mobile device 140 may be updated to reflect the reservation. As shown in FIG. 3C, for example, the mobile device may be a tablet device and the updated tile may be a more condensed version than the tile depicted in FIG. 3B. In step 303, the user may receive an alert when it is time to pick up the reserved vehicle. As shown in FIG. 3D, for example, the alert may be received on mobile device 150, such as a smartphone.

Once again, while the above process is discussed with respect to a car reservation, the exemplary method of FIG. 3A could apply to other types of reservations or services. For example, the process could be used for travel reservations, dinning reservations, meeting reservations, ticket reservations, etc.

In certain embodiments, the user interface may provide several ways for a user to interact with the interface or tiles. In some embodiments, the user interface may have multiple modes. For example, the user interface may include a dashboard mode and a zoomed mode. In the dashboard mode, the user may view multiple tiles, change the layout or size of the tiles, browse content in one or more of the tiles, and/or share content across tiles. As another example, the user interface may include a zoomed mode that creates an immersive view of a selected tile. In the zoomed mode, the other tiles may remain visible in the background. In the zoomed mode, all user interactions may be reserved for interactions for the selected tile. For example, in the zoomed mode, the selected tile may act as if it is in an independent application.

Figure 4:
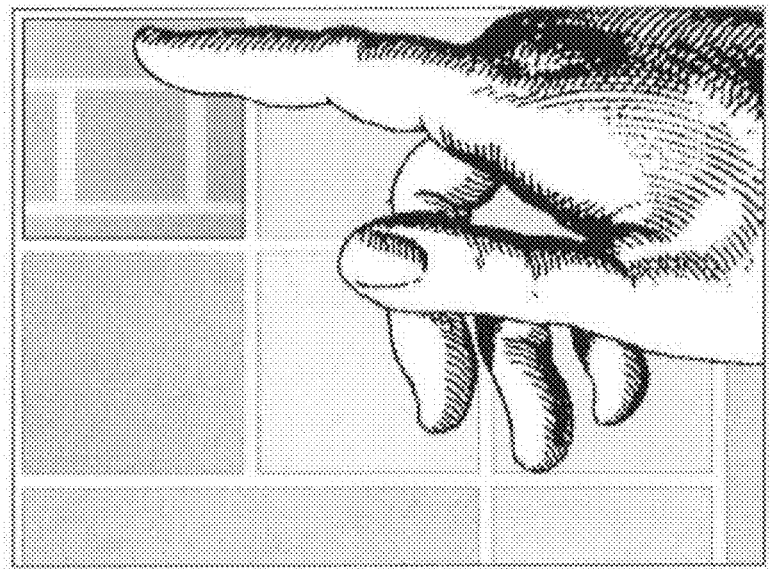
FIG. 4 depicts an exemplary process for rearranging tiles a dashboard, consistent with embodiments of the present disclosure.
Figure 4:
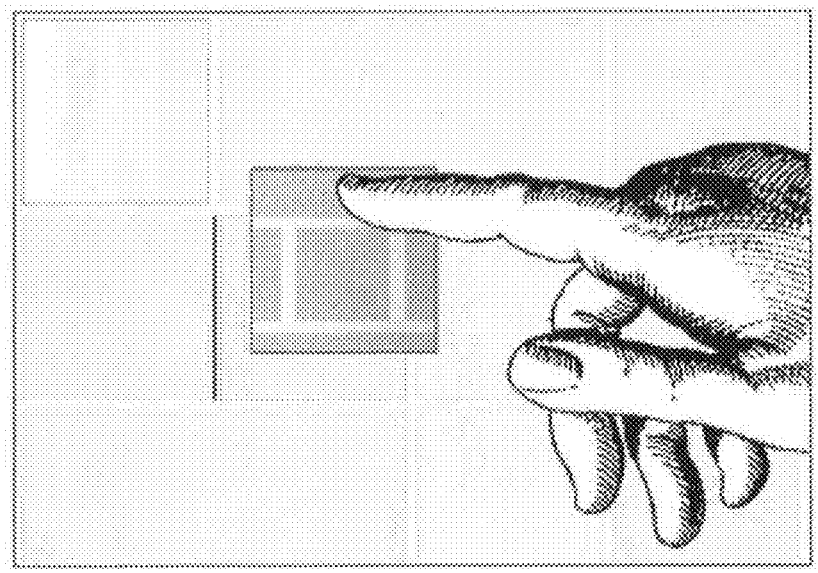

In the dashboard mode, the user may be provided with several ways to interact with the tiles. For example, the user may have one or more ways to rearrange the tiles. FIG. 4 depicts and exemplary process for rearranging tiles, consistent with embodiments of the present disclosure. While this example is based on a touch screen interface, it could also be implemented using an input device (such as a curser, a mouse, or pen) to replace the touch actions.

In step 400, the user taps and holds to grab a tile. The tap and hold may grab the smallest object around a tap location. Accordingly, if the tile contains a content object that can also be grabbed, grabbing the entire tile may require grabbing outside that object. At this time, the user interface may display an insertion point indicator that shows where the selected tile will be dropped. For example, in step 400 a box around the selected tile indicates that the tile will remain in its current location. In step 410, after the user drags the selected tile, a line to the left of a tile indicates that the selected box will be dropped to the left of that tile. In another embodiment, a selected tile may swell in response to a tap and hold. In response to dragging the selected tile, the other tiles my dynamically move out of the way to show how the user interface will be reconfigured once the tile is dropped. In a non-touch environment, a gripper may be displayed in response to a user hovering over a tile in place of using the tap and hold method. A user may also delete a tile by, for example, dragging it off the dashboard or to a trashcan. A user may also move tiles to create blank space, in which the background of the dashboard will show through.

In the dashboard mode, the user may be able to resize one or more of the tiles. This may allow the user to assign a relative importance to a tile based on its size. This relative importance may be used to assign relative sizes to the tile in other interfaces. For example, resizing a tile on mobile device 140 (e.g., a tablet) may cause a relative resizing on mobile device 150 (e.g., a smartphone).

Figure 5A:
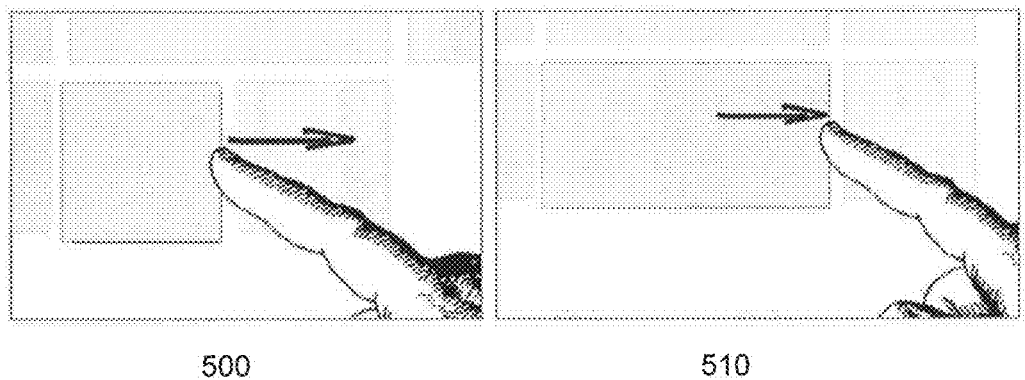
FIGS. 5A and 5B depict exemplary processes for resizing tiles in a dashboard, consistent with embodiments of the present disclosure.

FIG. 5A depicts an exemplary process for resizing a tile horizontally, consistent with embodiments of the present disclosure. In step 500, a user may tap and hold on the vertical gutter of the tile. This may cause the tile edge to be highlighted. In step 510, the user may drag right or left to resize the tile horizontally. For example, in step 500 the tile has a size of 1×1, but in step 510 the tile has a size of 2×1.

Figure 5B:
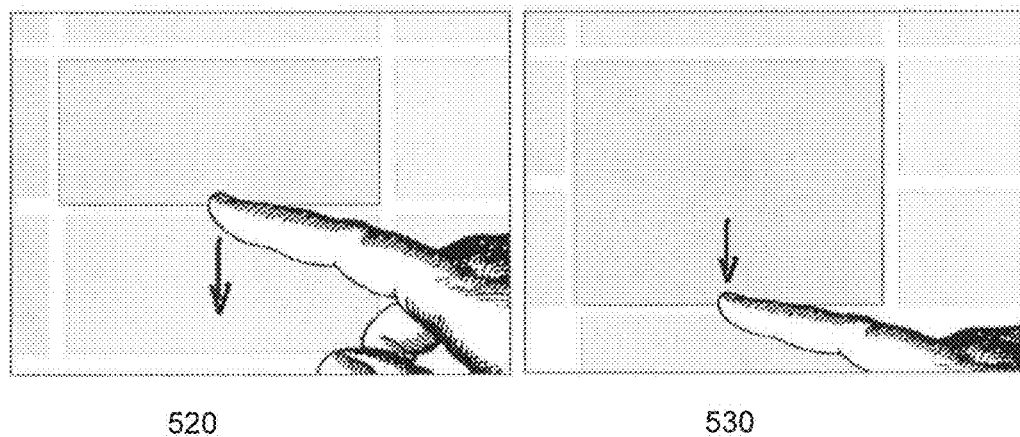

FIG. 5B depicts an exemplary process for resizing a tile vertically, consistent with embodiments of the present disclosure. In step 520, a user may tap and hold on the horizontal gutter of the tile. This may cause the tile edge to be highlighted. In step 530, the user may drag the edge of the tile up or down to resize the tile vertically. For example, in step 520 the tile has a size of 2×1, but in step 530 the tile has a size of 2×2.

Figure 6:
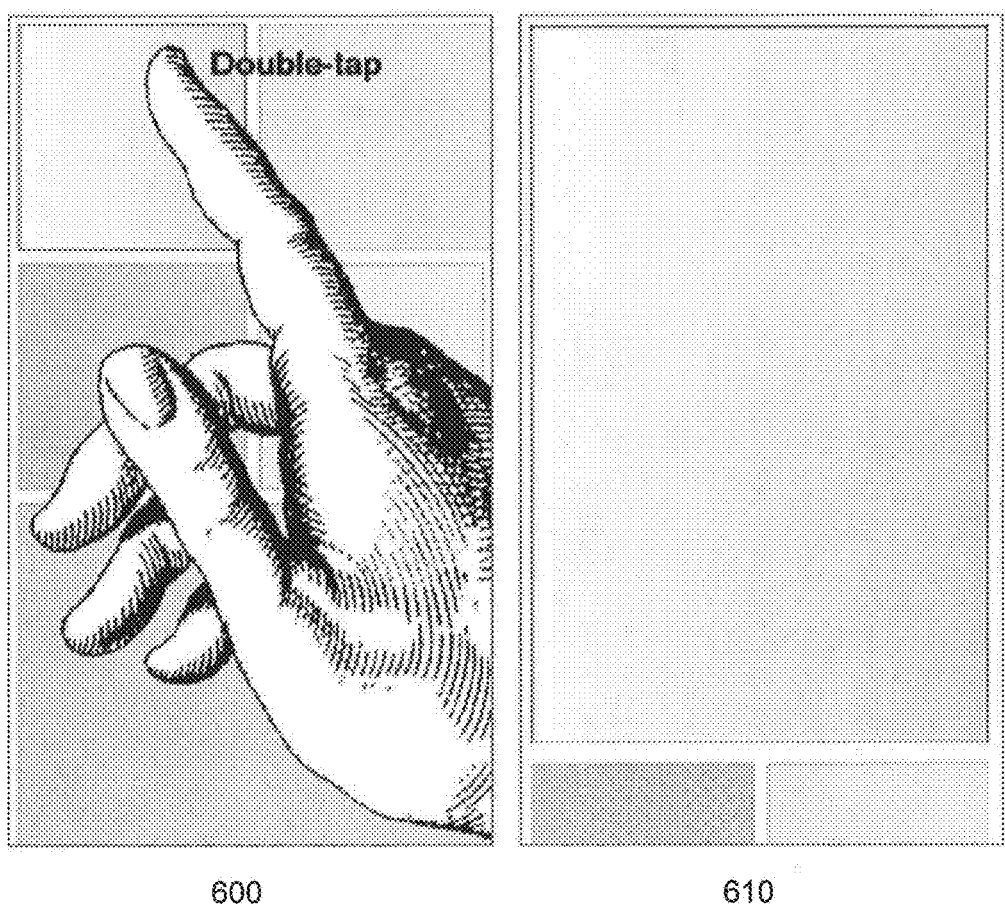
FIG. 6 depicts an exemplary process for changing views in a dashboard, consistent with embodiments of the present disclosure.

The user interface may also include one or more ways to transition between modes. FIG. 6 depicts an exemplary process form transitioning a tile from dashboard mode to zoom mode, consistent with embodiments of the present disclosure. In step 600, the user double taps on a tile in a dashboard mode. This may cause the tile to enter a zoom mode in step 610. Entering the zoom mode may cause the tile to be centered and may cause the tile to increase to its maximum viewing size. The maximum viewing size may be device dependent. Accordingly, a tile could have a different maximum viewing size for client 130, mobile device 140, and mobile device 150. Double taping the tile in zoom mode may cause the tile to return to dashboard mode.

The user interface may also provide interactions that allow the user to navigate the dashboard and the content within the tiles. For example, dragging in a gutter may scroll the entire screen. As another example, swiping within a tile may browse the content within the tile. For example, the user may swipe though a series of photos by swiping in a photo tile.

The user interface may also allow the use to flip over a tile to edit the tile's settings. The flipped over tile may be larger or smaller than the current size of the tile. In this case, the settings may float over the selected tile.

Consistent with embodiments of the present disclosure, the user interface may also provide cross-tile functionality. For example, as discussed above, tapping and holding may cause the smallest object around the tap and hold location to be selected. This may allow the user to select a content object within a tile and drag it to another tile or data entry element within a tile. The tile the content object is dragged to may react to the input based on the type of content in the content object.

Figure 7:
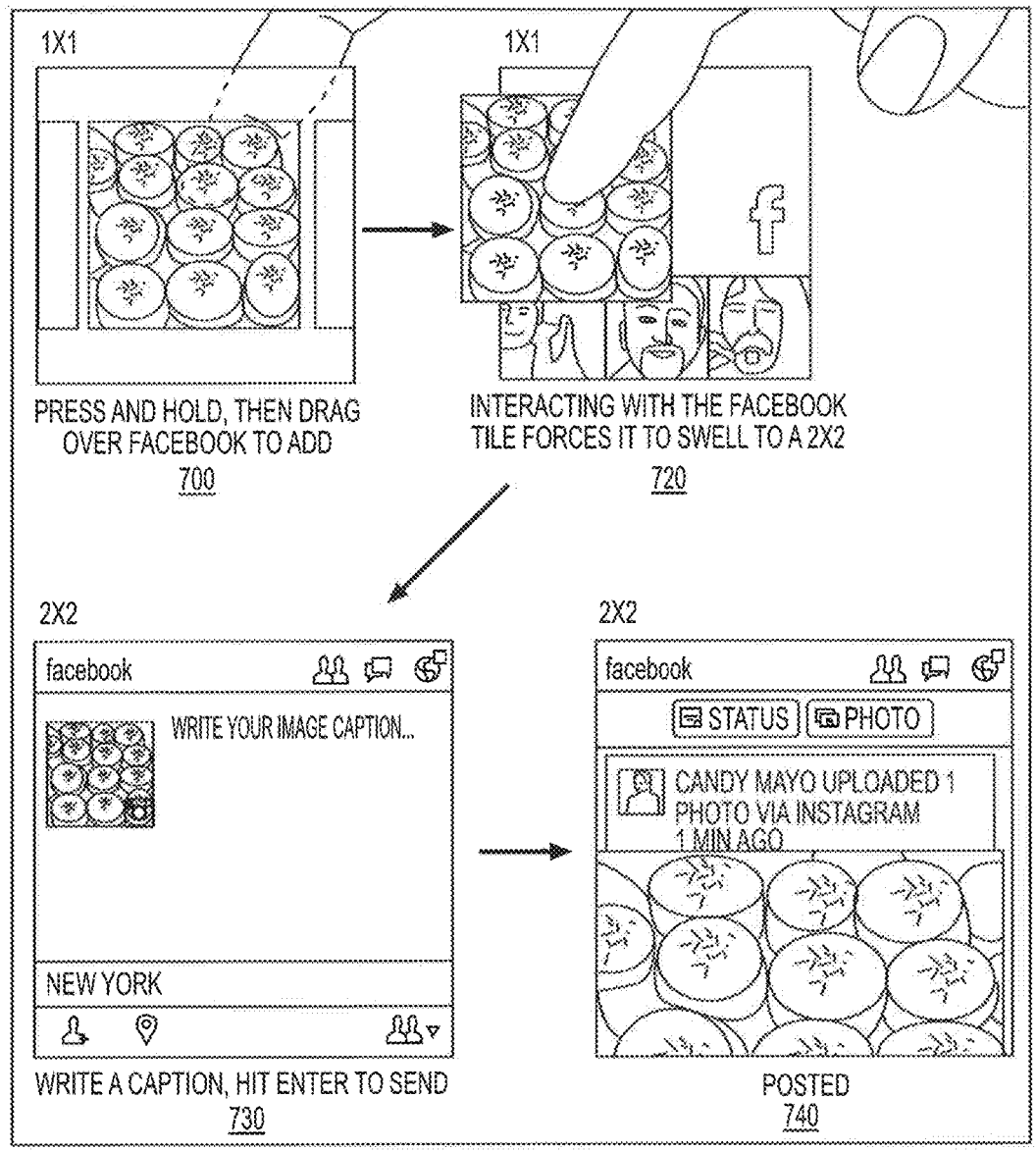
FIG. 7 depicts an exemplary process for sharing content between tiles in a dashboard, consistent with embodiments of the present disclosure.

FIG. 7 depicts an exemplary process that uses cross-tile functionality to post content to a social media outlet, consistent with embodiments of the present disclosure. In step 700, the user may press and hold on a content object (e.g., a photo, video, audio file, text, article, web clip, etc.) and drag it to a social media tile. If the social media tile is in a small size, e.g., 1×1, the tile may swell as shown in steps 720 and 730. In step 730, the social media tile may enter a post creation mode. For example, the user may be prompted to enter a caption for a photo, and may hit send to complete the post. Completing the post may cause client 130, mobile devices 140 or 150, or host server 100 to communicate the posting to an information server 110 for the social media outlet. The post may than be posted by the information server 110, which would then be communicated to client 130, mobile devices 140 or 150, or host server 100. This may cause the tile to be updated in step 740. The tile may remain in its swollen mode to display the post. The tile may also return to its original size after the post is completed or after a certain period of time.

In certain embodiments, when the user grabs the content to share, the tile for that content may shrink into the background. The user interface may visually indicate which of the tiles in the dashboard accept the selected content (e.g., based on transparency or shading). When the user drags the content to an acceptable target tile, the appearance of that tile may change to indicate that it is the current target.

In some embodiments, content may be shared by selecting a context menu to share the content. After the context menu is selected, a number of friends/contacts may be displayed with whom the content can be shared. Once the friend/contact is selected, the content may be shared. The display on the content on the user's dashboard may also be updated to display a small picture of the friend/contact the content was shared with. A similar process may also be used to share a tile using a context menu. Once a tile is shared, the content of the shared tile can be updated in real time. For example, the user may share a note tile that allows the user to share notes with selected friends/contacts. The user may provide read-only access or read/write access to the friends/contacts with whom the content is shared.

For example, from a notes tile, a button for creating a new note may give the user an option to create a shared note (e.g., to share a grocery list with their spouse). This may use the pinning action to create a new tile for this note and prompt the user to send to another user. If the users have shared items before, and they already have accounts, then the user may get an option to notify them of this note. If they do not already have an account, then the user can invite them via email or Facebook message. They may then get a message to create an account and they get the shared note (e.g., the grocery list).

In some embodiments, the user may indicate certain portions of the dashboard that are shared and others that are personal.

In certain embodiments, the information and interactions for the tiles may be dependent on the size of the tile. Moreover, selecting one or more elements in a tile may cause the tile to transition between sizes, such as small, medium, or large.

For example, a news type tile may provide information from one or more new sources. The new type tile may have a small tile size. The small tile size may have a size of one square. In the small size, the user may be able to swipe thought top stories. Each of the top stories may be represented, for example, by an image and a headline. Each top story may be displayed by overlaying the headline over the image for the story. In the small tile size, the user may also be able to select an article and provide it to another tile. For example, the user may be able to pin an article to the dashboard and/or share the article with another user via a messaging or social media tile.

A news type tile may have a medium tile size. The medium tile size may be, for example, 2 to 9 squares. In the medium tile size, the user may be presented with a vertical list or river of stories and can swipe to view the next set of stories. In the medium tile size, the user may be able to reveal the first paragraph of articles in a reading pane. The reading pane may be variable in size. In the reading pane, horizontal swipes may be used to go to the next page and vertical scrolling may be reserved for scrolling the entire screen. The user may also be able to select an article to open to a reading view A news type tile may have a large tile size. The large tile size may be, for example, 10 to 16 squares. In the large size, the news tile may include a full reading pane, sync the current article across the user's devices, and/or sync the current position in the article across the user's devices. For example, the large size of the tile may display a list of the last three articles read by the user, and may also provide a reading progress bar for each article. As the tile increases in size, the user interface may provide one or more contextual menus. For example, sharing buttons for social media and/or e-mail.

A mail type tile may provide an email service. The mail type tile may have a small size. The small tile size may be one square. In the small tile size, the mail type tile may display notification and/or summary of the inbox state. For example, the mail type tile may display the number of unread messages. In some embodiments, the small sized tile may auto-rotate through the sender and/or subject lines of the unread messages.

A mail type tile may have a medium tile size. The medium tile size may be 2 to 9 squares. In the medium tile size, the mail type tile may be able to see the latest few messages, show message senders, show message subjects, delete messages, swipe to see more messages, and/or tap to reply to a message (which may cause the mail type tile to swell to a compose mode). For example, the medium size mail type tile may provide a chronological list of e-mails that displays the sender, subject, timestamp, and a portion of the message. In the medium tile size, the user ay be able to drag an attachment or e-mail to share it with another tile or pin it to the dashboard. In some embodiments, selecting a message may cause it to be opened in a large tile size.

A mail type tile may have a large tile size. The large tile size may be 10 to 16 squares. In the large tile size, the mail type tile may include a message reading pane and functions to compose and/or reply to messages.

A photo type tile may provide one or more photos to the user. For example, a photo type tile may be a subscription to one or more photo feeds or services. The photo type tile may have a small size. The small tile size may be one square. In the small tile size, the user may be able to swipe through a feed of photos and/or grab a photo to share via a messaging or social media tile or to pin to the dashboard. In the small size, the photos may be presented, as thumbnails, one at a time. The user may have to option to set one or more of the photos as a background for the dashboard. Tapping on a thumbnail in the small size view may cause the photo to be maximized into the large size.

The photo type tile may have a medium size. The medium tile size may be 2 to 9 squares, In the medium tile size, multiple photos may be visible while swiping through the feed. Increasing the size of the tile may increase the number of photos that are visible.

The photo type tile may have a large size. The large tile size may be 9 to 16 squares. In the large tile size, the user may be able to view the photos in their maximum size. The user may be able to swipe thought the photos at their maximum size, A social media type tile may provide an interface to one or more social media networks or services (e.g., FACEBOOK™, TWITTER™, etc.). The social media type tile may have a small size. The small size may be one square. In the small size, the social media type tile may provide notifications and/or allow a user to drop content items onto it for sharing. Notification may include, for example, a count of new posts in a feed, a count of new messages, a count of new friend/contact requests, etc. For example, a user may create different social media type tiles for different types of social media events. For example, a social media type tile may be limited to instances where someone posts on the user's wall, comments on the user's wall, tags the user in a photo or location, comments on the user's status, and/or directly messages the user. Social media type tiles may also be limited to one or more types of content, such as photos, news feed data, messages, events, and/or notifications. For example, a social media type file may only display photos posted by the user's friends.

The social media type tile may have a medium size. The medium tile size may be 2 to 9 squares. In the medium tile size, the social media type tile may allow the user's news feed content to be displayed, to swipe through the news feed, and/or create a post.

The social media type tile may have a large size. The large tile size may be 9 to 16 squares. In the large tile size, the user may be able to view a timeline and/or have a large news feed view. The larger size social media type tile may also include a reading pane, similar to the reading panes discussed above.

A person/friend type tile may be created by selecting an option in context popup menu in a mail or social media type tile. This may create a tile that tracks posts or messages from a person or friend. The user may also integrate other feeds into the tile. For example, the person/friend type tile may display all messages from the person's e-mail address, TWITTER™feed, INSTAGRAM™feed, and FACEBOOK-™timeline. One type of person/friend type tile is a celebrity tile. These tiles may operate in a similar manner, but may also include news stories related to the celebrity.

The person/friend type tile may have a small size. The small size may be one square. In the small size, the person/friend tile may display an image for the person and may display a count of posts and/or messages for the person. The count may be displayed separately for each source of messages and posts.

The person/friend type tile may have a medium size. The medium tile size may be 2 to 9 squares. In the medium tile size, the person/friend type tile may allow the user to swipe thought the posts and/or messages. The user may also select one or more of the posts and/or messages. This may cause to post and/or message to be opened in the tile from which it originates.

The person/friend type tile may have a large size. The large tile size may be 9 to 16 squares. In the large tile size, the user may be presented with a layout for viewing all streams related to the person/friend.

A video type tile may display one or more videos from various sources or services. The video type tile may have a small size. The small size may be one square. In the small size, the user may be able to swipe through videos; play, pause, and/or resume the video; and/or remember the current selection and/or playback position across devices. A video type tile may also autoplay the next video one the current video ends.

The video type tile may have a medium size or a large size. The medium tile size may be 2 to 9 squares. The large tile size may be 9 to 16 squares. In the medium tile size or the large tile size, the video type tile may allow multiple video thumbnails to be displayed and/or a button to go to full-screen playback. For example, the video type tile may display videos from multiple channels.

A game type tile may allow a user to access one or more games services or applications to play a game in the user interface. The game type tile may have a small size. The small size may be one square. In the small size, the game type tile may display a game status, such as a score. Selecting a game may cause it to be opened in the zoomed or large mode. Increasing the size of the title to a medium size may allow the game to be played inside the dashboard mode.

The game type tile may have a medium size or a large size. The medium tile size may be 2 to 9 squares. The large tile size may be 9 to 16 squares. In the medium tile size or the large tile size, the game type tile may display a game view and/or reset a game state.

A map type tile may provide one or more mapping services to the user. The map type tile may have a small size. The small size may be one square. In the small size, the user may be able to drop items from other tiles to get an address associate with the item. The small size map type tile may provide a choice of maps or directions.

The map type tile may have a medium size. The medium tile size may be 2 to 9 squares. In the medium tile size, the user may also be able to enter a destination to get directions and/or provide tabs to display various points of interest on a map. For example, the user may be able to select a text direction or map direction view, in which the text or map may be scrollable. The user may be able to pin or share the text or map to the dashboard, as discussed above. If the user selects or enters a point of interest, the map may show nearby matching points of interest. For example, if the user enters movies, the user may be presented with a list of movies playing nearby and the locations of the theaters.

The map type may have a large size, The large tile size may be 9 to 16 squares. In the large tile size, a maximum map view may be presented. This can include additional details, such as traffic information.

A movie time type tile may allow a user to retrieve movie information from a movie service or application. The movie time type tile may have a small size. The small size may be one square. In the small size, the user may be able to swipe though movies. The movies may be movies playing near the user, new releases, and/or movies playing at the user's favorite theater, depending on the user's settings.

The movie time type tile may have a medium size. The medium tile size may be 2 to 9 squares. In the medium tile size, the user may be able to view movies now playing near them (based on a location determination or zip code entry), set one or more favorite theatres, play movie trailers, and/or play trailers in full screen.

The movie time type tile may have a large size. The large tile size may be 9 to 16 squares. In the large size, the user may also have a pane to read movie news. In the movie news pane, the current article and position may be synced across devices.

A sponsor type tile may include one or more advertisements from sponsor(s). The sponsor type tile may have a small size. The small tile size may be one square. In the small size, a branding element may be displayed. The sponsor type tile may have a larger size that allows videos or interactive elements to be displayed.

The user interface may also use a local data storage to enable offline access to one or more tiles. Making tiles available for offline use may be prioritized based on the frequency with which a user use's a tile, the size of the tile, the position of the tile, the amount of data needed to make the tile available offline, etc.

As noted above, the exemplary system of FIG. 1 may include one or more server systems, databases, and/or computing systems configured to receive information from entities in a network, process the information, and communicate the information with other entities in the network. In certain embodiments, the system of FIG. 1 may be configured to receive data over an electronic network, such as the Internet, process/analyze the content, and provide the content to one or more applications. For example, in one embodiment, the system of FIG. 1 may operate and/or interact with one or more host servers, one or more user devices, and/or one or more repositories, for the purpose of associating all data elements and integrating them into, for example, content and advertising systems.

As noted above, the various components of the system of FIG. 1 may include an assembly of hardware, software, and/or firmware, including memory, a central processing unit ("CPU"), and/or a user interface. For example, memory 104, 114, and 134 may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. A CPU may include one or more processors 102, 112, and 132 for processing data according to a set of programmable instructions or software stored in memory (e.g., software 106, 116, and 136). The functions of each processor may be provided by a single dedicated processor or by a plurality of processors. Moreover, processors may include any type or combination of input/output devices, such as a display monitor, keyboard, touch screen, and/or mouse. System 10 may be implemented using one or more technologies such as JAVA, Apache/Tomcat, Bus Architecture (RabbitMQ), MonoDB, SOLR, GridFS, Jepetto, Ruby-on-Rails, Sprockets, Devise, Rack, Wheel, Zepto, Modernizr, Underscore, jQuery, Angular, Ember, etc.

The system of FIG. 1 may also include or connect to one or more memory devices or data repositories ("databases") 108, 118, and 138, which may store data collected about the user, the user's social networks, and/or the data provider in the tiles discussed above. Local databases, e.g., data repository 138, may be user to cache content for offline use. The system may also include a data store for storing the software and/or instructions to be executed by a processor.

Client 130 and may include one or more of a tablet device, mobile phone, computer, television, or any other device that a user may use to access the user interface. Mobile devices 140 and 130 may similarly comprise a tablet device, mobile phone, or other mobile device that a user may use to access the user interface. In one embodiment, host server 100 may display the user interface in a web browser on client device 130 and/or mobile devices 140 and 130. In another embodiment, an application on client device 130 and/or mobile devices 140 and 130. Host server 100 may provide the content necessary to display a graphical user interface, such as the dashboard discussed above.

The system of FIG. 1 may also include any combination of email software, instant messaging software, document management software, webhosting software, and/or any other software or set of instructions. Such software and/or set of instructions may implement or support any number of the processes, features, and interfaces disclosed herein. In another embodiment, the software may include a set of instructions executable by a processor to provide the methods, features, and interfaces described herein.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, systems and methods consistent with the disclosed embodiments may be implemented as a combination of hardware and software or in hardware alone. Examples of hardware include computing or processing systems, including personal computers, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Programmable instructions, including computer programs, based on the written description and disclosed embodiments are within the skill of an experienced developer. The various programs or program modules may be created using any of the techniques known to one skilled in the art or may be designed in connection with existing software. For example, program sections or program modules may be designed in or by means of C#, Java, C++, HTML, XML, CSS, JavaScript, or HTML with included Java applets. One or more of such software sections or modules may be integrated into a computer system or browser software or application.

In some embodiments disclosed herein, some, none, or all of the logic for the above-described techniques may be implemented as a computer program or application or as a plug-in module or subcomponent of another application. The described techniques may be varied and are not limited to the examples or descriptions provided. In some embodiments, applications may be developed for download to mobile communications and computing devices (e.g., laptops, mobile computers, tablet computers, smart phones, etc.) and made available for download by the user either directly from the device or through a website.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

It is intended, therefore, that the specification and examples be considered as exemplary only. Additional embodiments are within the purview of the present disclosure and the following claims.

What is claimed:

1. A computer-implemented method for providing an interactive user interface with a plurality of tiles, the method comprising the following operations performed by one or more processors:

displaying, on a display device of a first user, the plurality of tiles that are associated with a plurality of sources;

receiving, from the first user, a selection of first content within a first tile in the plurality of tiles, the first content being provided by a first information provider;

dragging, based on input from the first user, the selected first content onto a second tile of the plurality of tiles, the second tile including second content provided by a second information provider;

enlarging the second tile on the display device in response to the dragging, the enlarged second tile prompting the first user to enter a caption for the first content;

sending, based on the dragging and entering by the first user, the selected first content and the caption to the second information provider to share the selected first content and the caption with a second user; and returning the enlarged second tile to an original size after the first user enters the caption for the first content and sending the selected first content and the caption to the second information provider.

2. The method of claim 1, wherein the device of the first user includes at least one of a web browser or application.

3. The method of claim 1, wherein at least one of the first or second content is at least one of a photo, video, or article.

4. The method of claim 1, wherein the second information provider provides a messaging service.

5. The method of claim 1, wherein the second information provider provides a social network service.

6. The method of claim 1, wherein the prompt includes a request for an address of the second user.

7. The method of claim 1, wherein the prompt includes a request for a description of the selected content.

8. A system of a first user for providing a portal, the system comprising:
    a display device;
    at least one processor; and
    a memory storing a set of instructions that, when executed by the at least one processor, cause the at least one processor to:
        display, on the display device, a plurality of tiles that are associated with a plurality of sources;
        receive, from the first user, a selection of first content within a first tile in the plurality of tiles, the first content being provided by a first information provider;
        drag, based on input from the first user, the selected first content onto a second tile of the plurality of tiles, the second tile including second content provided by a second information provider;
        enlarge the second tile on the display device in response to the dragging, the enlarged second tile prompting the first user to enter a caption for the first content;
        send, based on the dragging and entering by the first user, the selected first content and the caption to the second information provider to share the selected first content and the caption with a second user; and
        return the enlarged second tile to an original size after the first user enters the caption for the first content and sending the selected first content and the caption to the second information provider.

9. The system of claim 8, wherein the device of the first user includes at least one of a web browser or application.

10. The system of claim 8, wherein at least one of the first or second content is at least one of a photo, video, or article.

11. The system of claim 8, wherein the second information provider provides a messaging service.

12. The system of claim 8, wherein the second information provider provides a social network service.

13. A non-transitory computer-readable medium storing a set of instructions which, when executed by at least one processor, causes the at least one processor to perform a method comprising:
    displaying, on a display device of a first user, a plurality of tiles associated with a plurality of sources;
    receiving, from the first user, a selection of first content within a first tile in the plurality of tiles, the first content being provided by a first information provider;
    dragging, based on input from the first user, the selected first content onto a second tile of the plurality of tiles, the second tile including second content provided by a second information provider;
    enlarging the second tile on the display device in response to the dragging, the enlarged second tile prompting the first user to enter a caption for the first content;
    sending, based on the dragging and entering by the first user, the selected first content and the caption to the second information provider to share the selected first content and the caption with a second user; and
    returning the enlarged second tile to an original size after the first user enters the caption for the first content and sending the selected first content and the caption to the second information provider.

14. The computer-readable medium of claim 13, wherein the device of the first user includes at least one of a web browser or application.

15. The computer-readable medium of claim 13, wherein at least one of the first or second content is at least one of a photo, video, or article.

16. The computer-readable medium of claim 13, wherein the second information provider provides a messaging service.

17. The computer-readable medium of claim 13, wherein the second information provider provides a social network service.

* * * * *